United States Patent
Ono et al.

(10) Patent No.: US 6,650,373 B2
(45) Date of Patent: *Nov. 18, 2003

(54) DISPLAY APPARATUS

(75) Inventors: Yoshiki Ono, Tokyo (JP); Jun Someya, Tokyo (JP); Yoshiaki Okuno, Tokyo (JP)

(73) Assignee: Mitsubishi Denki Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/013,185

(22) Filed: Jan. 26, 1998

(65) Prior Publication Data

US 2002/0047913 A1 Apr. 25, 2002

(30) Foreign Application Priority Data

Jan. 30, 1997 (JP) ............................................. 9-016858

(51) Int. Cl.$^7$ ................................................. H04N 5/14
(52) U.S. Cl. .......................... 348/673; 348/687; 345/63
(58) Field of Search ................................. 348/687, 688, 348/689, 690, 673, 447, 910, 173, 377, 380, 730, 790, 770, 796, 797; 345/211, 212, 60, 63

(56) References Cited

U.S. PATENT DOCUMENTS

| | | | | | |
|---|---|---|---|---|---|
| 4,489,349 A | * | 12/1984 | Okada | ........................ | 348/674 |
| 5,166,795 A | * | 11/1992 | Lee et al. | .................... | 348/687 |
| 5,210,610 A | * | 5/1993 | Kanashiki et al. | .......... | 348/672 |
| 5,546,134 A | * | 8/1996 | Lee | ............. | 348/673 |
| 5,870,154 A | * | 2/1999 | Conover et al. | ............ | 348/673 |
| 5,872,602 A | * | 2/1999 | Johnson | ...................... | 348/687 |
| 5,969,709 A | * | 10/1999 | Kim | .......................... | 348/687 |
| 5,978,041 A | * | 11/1999 | Masuda et al. | ............. | 348/687 |

FOREIGN PATENT DOCUMENTS

| | | | | |
|---|---|---|---|---|
| JP | 1193797 A | * | 8/1989 | |
| JP | 6202580 A | * | 7/1994 | |
| JP | 633397 A | * | 12/1994 | |
| JP | 6332402 A | * | 12/1994 | |

* cited by examiner

Primary Examiner—John Miller
Assistant Examiner—Trang U. Tran
(74) Attorney, Agent, or Firm—Birch, Stewart, Kolasch & Birch, LLP

(57) ABSTRACT

In a period from temporal storage of a video signal to reading and displaying of the video signal, an average value 121 of the brightness levels obtained from a video signal before the video signal is stored in a storage means 3 and a predetermined target value 122 are used to perform a calculation by using a proportionality term and an integration term so that a quantity of limited electric currents is obtained. Moreover, the quantity of limited electric currents is provided with a non-response region or a hysteresis characteristic.

8 Claims, 9 Drawing Sheets

DISPLAY APPARATUS

BACKGROUND OF THE INVENTION

The present invention relates to a display apparatus arranged to limit an electric current therein, and more particularly to a display apparatus, such as a CRT, a plasma display, an LED display and a field emission display, having a characteristic that power consumption varies when the brightness of a displayed image varies.

Self-emission type display apparatuses including CRT, a plasma display, an LED display and a field emission display, generally encounter vary in power consumption therein when the brightness of a displayed image varies.

The reason for this lies in that the quantity of electric currents which flow in the display portion is enlarged because light beams must be emitted more intensely and the number of emission times must be enlarged when a bright image is displayed. When a dark image is displayed, the quantity of electric currents which flow in the display portion is reduced because light beams must be weakened and the number of emission times must be decreased.

Under circumstances where saving of the energy resources is required from a global viewpoint, e.g. display apparatuses are required to have large-size screens and display apparatuses as used in vehicles and on portable telephones, power saving has been required for the apparatus. Power saving realizes advantages for users and attains effects to be obtained in that loads which must be borne by the display portion and the power supply circuit of the display apparatus can be reduced, the size of circuit can be reduced and low-cost elements can be employed. In addition, the lifetime of the display apparatus can be extended.

Therefore, a method has recently been employed which uses a characteristic which is apparent for a self-emission type display apparatus and with which power consumption varies when the brightness of a displayed image varies in order to save power.

Referring to the drawings, an example of the current limiting circuit will now be described in such a manner that a conventional current limiting circuit employed in a plasma display is taken as an example.

FIG. 15 is a block diagram showing an essential portion of the display apparatus having the conventional current limiting circuit. Referring to FIG. 15, reference numeral 1 represents an A/D conversion means for video signals, 2 represents a video-signal processing means, 3 represents a storage means, 4 represents a display sequence control means, 5 represents a panel of the plasma display, 11 represents a means 11 for generating the number of pulses to be retained, 12 and 31 represent multiplying means, 32 represents a smoothing means and 33 represents a pulse controlled-variable calculating means.

The operation will now be described. The operation which is performed until an image is displayed will now be described in accordance with the flow of a video signal. The A/D conversion means 1 A/D-converts an analog video signal 101 which is supplied to the plasma display to output digital video data 102. The video signal is treated as digital data in a portion following the A/D conversion means 1. The video-signal processing means 2 subjects digital video data 102 output from the A/D conversion means 1 to brightness, contrast, color temperature correction and gamma conversion processes to output video signal data 103 subjected to the video signal process. The storage means 3 has two storage means, which are a first storage means 36 and a second storage means 37, as shown in FIG. 16. Each of the storage means is a field memory or a frame memory. When the display method of the panel is interlace display, the storage means is able to store video signal for two fields. When the display method is progressive display, the storage means is able to store video signal for two frames. Selectors 38 and 39 disposed in front and behind the storage means 36 and 37 are exclusively and independently operated. When the first selector 38 adjacent to the input portion selects the first storage means 36, the second selector 39 adjacent to the output portion selects the second storage means 37. When the first selector 38 adjacent to the input portion selects the second storage means 37, the second selector 39 adjacent to the output portion selects the first storage means 36. If the first selector 38 adjacent to the input portion selects the first storage means 36, the first storage means 36 is being operated in a write mode. Thus, video signal data 103 supplied to the storage means is written on the first storage means 36. In the foregoing period, the second storage means 37 is operated in the reading mode so that sub-field data 104 having a predetermined number of bits is read from the second storage means 37. When the storage means 3 is interposed, video signal data 103 can be converted into a plurality of sub-field data items 104 which are divided in terms of time. Therefore, the storage means 3 is an important element for the plasma display which displays a gray-scale image by performing pulse-width modulation also when the interlace display is performed. The display sequence control means 4 outputs, to the panel 5, sub-field data 104 of the image signal read from the storage means 3 as write data 105 for selecting cells in the panel 5 from which light is emitted. The panel 5 operates writing electrodes and displays the image in accordance with write data 105.

The operation will now be described which is performed until the number of pulses to be retained for generating retaining discharge to cause the panel to emit light is determined, the description being performed along the flows of data of the number of pulses to be retained. A means 11 for generating the number of pulses to be retained generates and outputs data 111 of the number of pulses to be retained which corresponds to sub-fields. A multiplying means 12 multiplies data 111 of the number of pulses to be retained output from the means 11 for generating the number of pulses to be retained and a controlled variable 124 of the number of pulses (to be described later) for limiting the electric current to output data 112 of the number of pulses to be retained after the electric current is limited. The display sequence control means 4 generates pulse-shape data 113 for causing the panel to emit light by the number instructed with data 112 of the number of pulses to be retained after the electric current is limited. The display sequence control means 4 writes a display position on the panel with write data 105 corresponding to the sub-field, and then outputs, to the panel 5, pulse-shape data 113 for causing the panel to emit light. The panel 5 applies pulse-shape waveform to an electrode after data is written on the panel so that only cells written with write data 105 emit light in accordance with pulse-shape data 113 so that an image is displayed.

The operation for limiting the electric current will now be described. The multiplying means 31 multiplies sub-field data 104 of the video signal output from the storage means 3 and data 112 of the number of pulses for retaining light emission which is output to the panel to perform an equivalent calculation of the quantity of light to be emitted from the panel in one sub-field period. Then, the multiplying means 31 outputs pseudo quantity 131 of light to be emitted which is obtained by the equivalent calculation. Sub-field data 104 of the video signal corresponds to the number of cells which emit light, while data 112 of the number of pulses to be retained corresponds to the number of light emitting operations of each cell. The smoothing means 32 subjects the pseudo quantity 131 of light to be emitted which varies in sub-field units to a smoothing process to output a smoothed quantity 132 of light to be emitted. The pulse controlled-variable calculating means 33 causes a deviation detection means 34 to obtain deviation 133 of the quantity 132 of light to be emitted with respect to a target value 122 of the quantity of light to be emitted. The deviation 133 is linearly converted into a controlled variable 124 of the number of pulses by a linear conversion means 35 in such a manner that the quantity of light to be emitted is limited only when the quantity 132 of light to be emitted is larger than the target value 122. The controlled variable 124 is output from the pulse controlled-variable calculating means 33. The controlled variable 124 of the number of pulses is expressed by a decimal fraction not less than 0 nor more than 1. The controlled variable 124 reduces the number of pulses to be retained in the multiplication with the data 111 of the number of pulses to be retained which is performed by the multiplying means 12. Therefore, the controlled variable 124 corresponds to the quantity of electric current which must be limited with which the electric current is limited by a larger degree in proportion as the controlled variable 124 is reduced. When the value of the controlled variable 124 of the number of pulses is small, the number of pulses to be retained is reduced by the multiplying means 12. Thus, the number of light emission times from the panel is reduced, and the displaying current which flows in the panel is limited.

The conventional current limiting circuit adapted to the plasma display encounters time delay when the pseudo quantity 131 of light to be emitted is smoothed by the smoothing means 32 as shown in FIG. 15. FIG. 18 shows time transition of the pseudo quantity 131 of light to be emitted which takes place in the conventional circuit. As shown in FIG. 18, the pseudo quantity 131 of light to be emitted is obtained in sub-field units. Even if a still image is being displayed, the quantity of light to be emitted from adjacent sub-fields is discontinuous. Therefore, the smoothing process must be performed by the smoothing means 32. If the smoothing process is simply performed by a low-pass filter, the smoothing process, however, inhibits measurement of the quantity of light to be emitted in field units. As a result, time delay takes place. Even if the quantities of light to be emitted are integrated in field units as shown in FIG. 18, the quantity of light to be emitted cannot be extracted only after the integration of the quantity of light to be emitted is completed and movement to a next field is performed. Thus, time delay of one field takes place in performing the control. If the control is delayed as described above, an excessively large current flows in a case where the quantity of light to be emitted is rapidly increased. In this case, a power supply circuit having a large capacity is required: Thus, increasing cost and limiting the ability to reduce weight.

Since limitation of the electric current results in the brightness varying, the visual characteristic must be considered. For example, overshooting and slight variation of the controlled variable results in flickers being recognized. Therefore, the current limiting circuit for the plasma display must have high response speed and must avoid noise caused variations. The response characteristic of a current control system of the conventional structure depends on the filtering characteristic of the smoothing means 32. If the smoothing means 32 comprises a simple low-pass filter, raising of the response speed results in flickers taking place. The flickers take place because of an influence of variations of the pseudo quantity 131 of light to be emitted in each sub-field and an influence of variation in the waveform of the pseudo quantity 131 of light to be emitted occurring as time elapses attributable to movement of a figure of the bits to the right or left. Another problem arises in that varying the setting of the filter requires a great labor. Even if the quantity of light to be emitted is integrated in field units, the time delay of the process encounters mismatch between the quantity of light to be emitted and the controlled variable. Thus, there arises a problem in that flickers take place.

SUMMARY OF THE INVENTION

To achieve the problems experienced with the conventional display apparatus, an object of the present invention is to provide a display apparatus having a current limiting means which is capable of raising the response speed of current limitation while preventing an influence on the visual characteristic.

A display apparatus according to the present invention limits electric currents without any response delay by a using structure comprising a current limiting means for obtaining a quantity of an electric current which must be limited by using time delay occurring because the video signals are temporarily stored in the storage means. The current limiting means achieves the limiting of the electric current within a period of time starting with when the video signal is stored on the storage means and ending with when the video signal is read out and displayed. The current limiting means limits the electric current in dependence on the video signals before they are stored.

A current limiting means is provided which does not use the product of the number of cells from which light is emitted and the number of light emission times from the cells as the index of the quantity of light to be emitted, the current limiting means being arranged to use an average value of video signals.

A current limiting means is provided which performs a smoothing process which is not a simple smoothing process using a low pass filter to which the pseudo quantity of light to be emitted is subjected. The smoothing process is performed by using an average value of video signals obtained in field units.

A current limiting means is provided which obtains the quantity of electric current which must be limited by performing a calculation in accordance with an average value of video signals and a predetermined target value.

A current limiting means is provided which obtains the quantity of electric current which must be limited by performing a calculation using a proportionality term and an integration term.

A current limiting means is provided which obtains the quantity of electric current which must be limited by performing a calculation using a proportionality term, an integration term and a differentiation term.

Moreover, a non-response region is provided for the quantity of the electric current which must be limited.

In addition, a hysteresis characteristic is provided for the quantity of the electric current which must be limited.

A non-response region and a hysteresis characteristic are provided for the quantity of the electric current which must be limited.

To limit electric currents without any response delay, a current limiting means is provided which obtains a quantity of an electric current which-must be limited by using time delay occurring because the video signals are temporarily stored in the storage means, the current limiting means being arranged to obtain, in a period of time after the video signal is stored to reading and displaying the video signal, the quantity of the electric current which must be limited by dividing a frame into a plurality of blocks and by obtaining local contrast in the frame by obtaining an average value of brightness levels of the video signals in the block in accordance with a predetermined reference value and the local contrast.

DETAILED DESCRIPTION OF THE PREFERRED EMBODIMENTS

A display apparatus according to an embodiment of the present invention is arranged to obtain a quantity of an electric current which must be limited in a period from temporal storage of video signals to reading and display the video signals. The quantity is obtained in accordance with an average value of brightness levels of video signals, which have been obtained from the video signals obtained before the video signals are stored in the storage means, and a predetermined reference value. Therefore, the operation for limiting electric currents can be performed without any response delay.

The quantity of electric currents which must be limited is obtained by performing a calculation using a proportionality term and an integration term in accordance with the average value of brightness levels of video signals and the predetermined reference value. Therefore, a greater degree of freedom is obtained when the controlled variable and the response speed are varied.

The quantity of electric currents which must be limited is obtained by performing a calculation using a proportionality term, an integration term and a differentiation term, a greater degree of freedom can be obtained when the response characteristic is varied.

Since the quantity of electric currents which must be limited has the gap characteristic, flickers of the frame occurring due to noise and slight erratic motion of the image can be prevented even if the response speed is raised.

Since the quantity of electric currents which must be limited has the hysteresis characteristic, a stationary deviation can be prevented and flickers of the frame occurring attributable to noise and slight erratic motion of the image can be prevented.

Since the quantity of electric currents which must be limited has both of the gap characteristic and the hysteresis characteristic, a great degree of freedom can be obtained in performed turning. Even if the response speed is raised, flickers of the frame occurring attributable to noise and slight erratic motion of the image can furthermore effectively be prevented.

Moreover, the frame is divided into a plurality of blocks and the average value of the brightness levels of video signals in the block is obtained. Thus, the local contrast in the frame is obtained and the local contrast is used as a representative value of the video signals. Therefore, the control of the electric current can be performed in such a manner that partial distortion of the panel attributable heat can be prevented.

Embodiments of the present invention will now be described in such a manner that a plasma display is taken as an example.

(First Embodiment)

Figure 1:
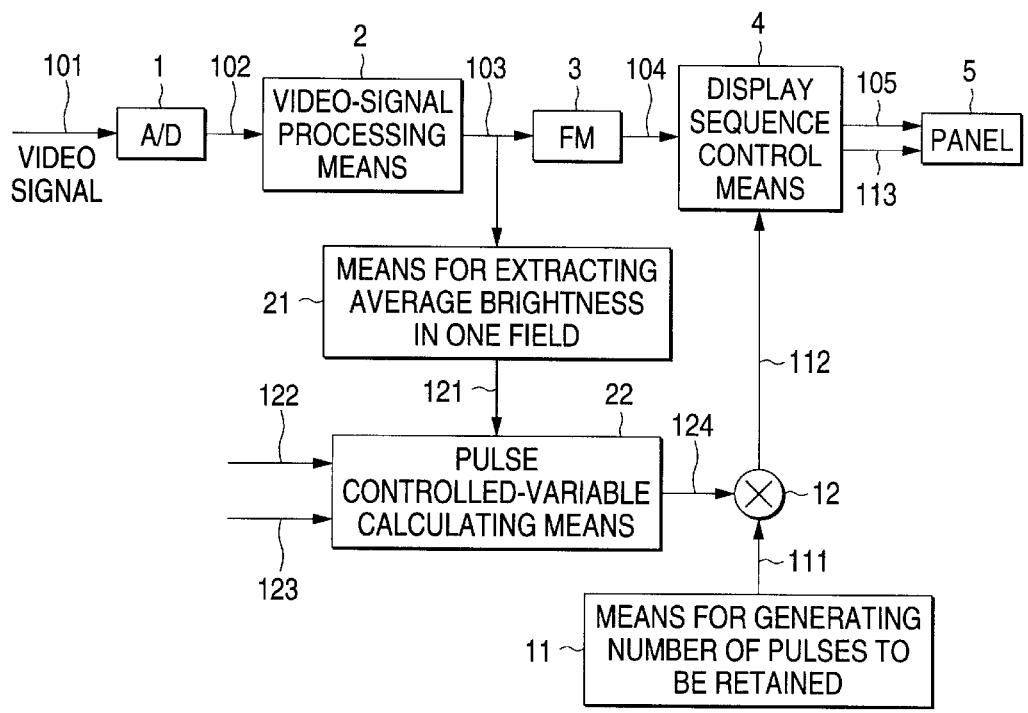
FIG. 1 is a diagram showing the structure of a display apparatus according to a first embodiment of the present invention.

FIG. 1 is a block diagram showing an essential portion of the structure of a display apparatus according to a first embodiment of the present invention. Referring to FIG. 1, reference numeral 1 represents an A/D conversion means for video signals, 2 represents a video-signal processing means, 3 represents a storage means, 4 represents a display sequence control means, 5 represents a panel of the plasma display, 11 represents a means for generating the number of pulses to be retained and 12 represents a multiplying means.

Reference numeral 21 represents an average-brightness extracting means for obtaining an average value of brightness levels of video signals in field units. Reference numeral 22 represents a pulse control-variable calculating means for limiting electric currents.

Figure 2:
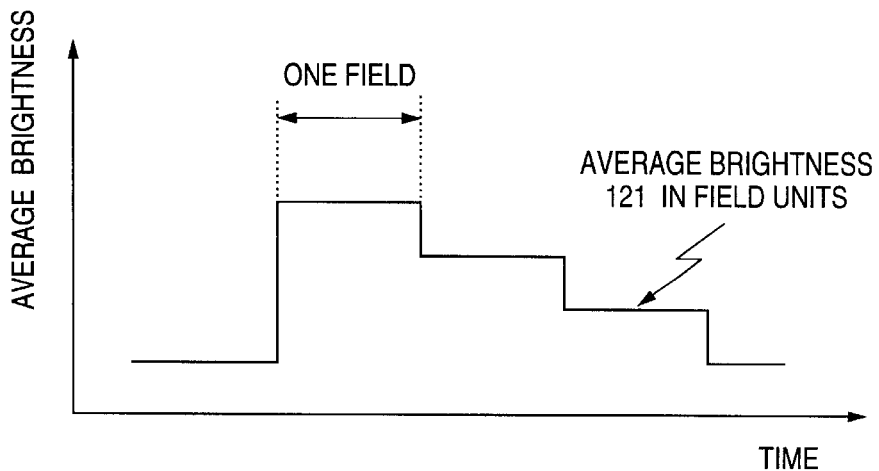
FIG. 2 is a graph showing a average brightness output signal in the display apparatus according to the first embodiment.

The operation will now be described. The operation which is performed until an image is displayed and the operation which is performed until the number of retained pulses for generating retained discharge to cause the panel to emit light is determined are the same as those of the conventional example. Therefore, the same operations are omitted from description. Only the operation for limiting electric currents will now be described. The average-brightness extracting means 21 adds video signal data 103 output from the video-signal processing means 2 to one another for one field. Then, the average-brightness extracting means 21 performs subtraction of the number of data items obtained by adding and a maximum value of the average value so as to calculate average brightness 121 in one field. Therefore, the range of the average brightness 121 is normalized to a range from 0 to 1 which is expressed as the average brightness. Even a value obtained by adding video signals can be made to be the same by performing normalization. FIG. 2 shows time transition of the average brightness 121. The average brightness 121 corresponds to the smoothed pseudo quantity 132 of light to be emitted according to the conventional structure. The average brightness 121 is used as an index of an actual quantity of light to be emitted from a panel. Note that the pseudo quantity 132 of light to be emitted according to the conventional structure has time delay. On the other hand, the average brightness 121, which is extracted in front of the storage means, enables the calculation of the average value to be performed during an operation for writing data on the storage means. Therefore, time delay does not take place. Thus, a response is made after display is performed one time with the conventional structure. With the first embodiment, the electric current is limited with display data when display is performed. The pulse control-variable calculating means 22, which will be described later, uses the average brightness 121 and a target value 122 of the quantity of electric currents which must be limited to calculate and output a controlled variable 124 of the number of pulses. Reference numeral 123 represents a response characteristic parameter which enables a parameter of the response characteristic of the pulse control-variable calculating means 22 to be controlled from outside to facilitate variation in the response characteristic. The controlled variable 124 of the number of pulses similar to that in a conventional structure, is expressed by a decimal fraction not less than 0 nor more than 1. Therefore, the controlled variable 124 causes the number of pulses to be retained to be reduced when the multiplying means 12 performs multiplication with the data 111 of the number of pulses to be retained. Therefore, the controlled variable 124 corresponds to the quantity of electric currents which must be limited with which the electric current is limited in proportion as the controlled variable 124 is reduced. If the value of the controlled variable 124 is small, the multiplying means 12 reduces the number of retained pulses. Thus, the number of light emission times from the panel is reduced, and the electric current which flows in the panel is limited.

Figure 3:
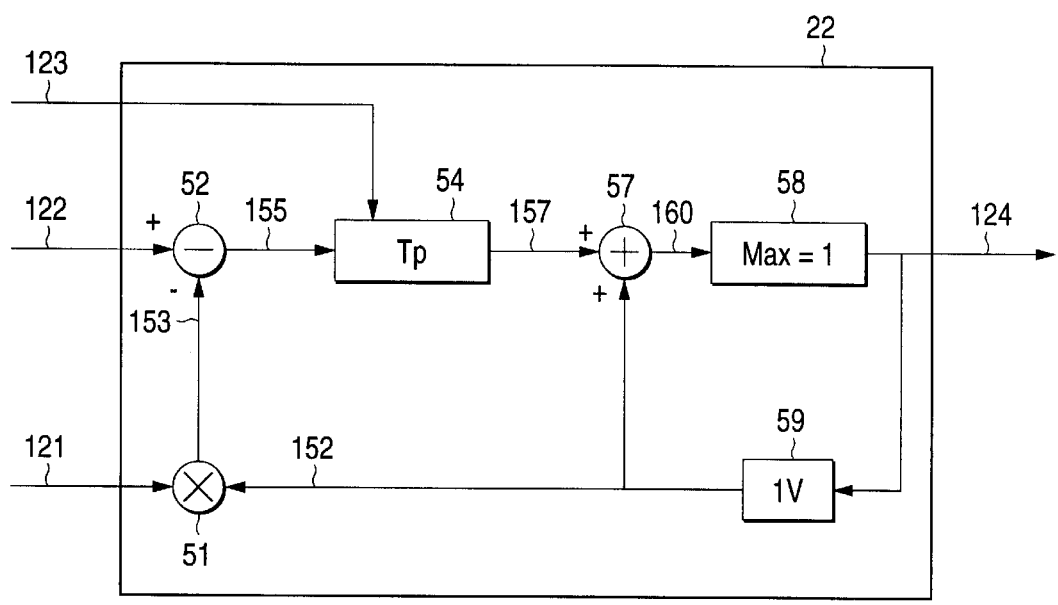
FIG. 3 is a diagram showing the structure of a pulse control-variable calculating means of the display apparatus according to the first embodiment.

The operation of the pulse control-variable calculating means 22 will furthermore be described with reference to FIG. 3. FIG. 3 is a diagram showing the structure of the pulse control-variable calculating means 22 of the display apparatus according to the first embodiment. Referring to FIG. 3, reference numeral 51 represents a multiplying means, 52 represents a deviation detection means, 54 represents a proportionality-term calculating means, 57 represents an addition means, 58 represents a limiter and 59 represents a delay means for delaying one field period.

Figure 4:
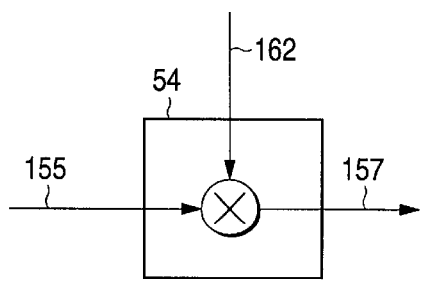
FIG. 4 is a diagram showing a means for calculating a proportionality term of the display apparatus according to the first embodiment.

The operation will now be described. The multiplying means 51 calculates a product of the average value 121 of the brightness levels of video signals and a controlled variable 152 of the number of pulses delayed by one field period. Then, the multiplying means 51 outputs a predicted value 153 of average brightness after the current control of the number of pulses is performed. The deviation detection means 52 calculates a deviation of the predicted value 153 from a predetermined target value 122 to output a deviation 155. The proportionality-term calculating means 54, as shown in FIG. 4, calculates the product of the deviation 155 and a proportionality-term constant 162 included in the response characteristic parameter 123 to output proportionality-term data 157. The addition means 57 adds proportionality-term data 157 and the controlled variable 152 of the number of pulses delayed by one field period to output a controlled variable 160 of the number of pulses. The limiter 58 subjects the controlled variable 160 of the number of pulses output from the addition means 57 to a limiter to output the controlled variable 124 in a predetermined range. The limiter 58 limits the maximum value of the controlled variable 124 of the number of pulses to 1 so that overshooting is prevented regardless of the set response characteristic. That is, the electric current can be limited in such a manner that data 112 of the number of pulses to be retained after the electric current is limited does not exceed data 111 of the number of pulses to be retained generated by the means 11 for generating the number of pulses to be retained shown in FIG. 1. The delay means 59 delays the controlled variable 124 of the number of pulses by one field to enable the controlled variable 124 of the number of pulses to be used in a calculation of a next field.

The structure of the pulse control-variable calculating means 22 shown in FIG. 3 must finally perform subtraction with the average value 121 of the brightness levels to accurately perform the calculation. To omit a process of subtracting with the average value 121 of the brightness levels which are variables, all of the values of the average value 121 of the brightness levels, the target value 122 of the same and the controlled variables 152, 160 and 124 of the number of pulses are normalized to be in the range between 0 and 1, inclusive. Thus, a subtracting means is omitted. When the foregoing process is realized by hardware in a case where the original maximum value is an exponent of 2–1, the bit shift for normalization can be completed by simply changing the portion to which the wiring is connected. Therefore, the size of the circuit is not substantially enlarged. As a result, a portion of the circuit required to perform the subtraction calculation can be saved.

If the controlled variable is normalized and the subtracting means is omitted, the approximation can be established only when the average value 121 of the brightness levels is 1. In the other cases, the controlled variable is undesirably reduced in proportion as the average value 121 of the brightness levels is reduced. An influence of the approximation specifically results in deterioration of the response characteristic when a bright image is varied to a dark image. However, a relatively satisfactory response can be obtained when the controlled variable 124 of the number of pulses must be reduced. Therefore, the main purpose of the circuit for limiting the electric current can be achieved.

That is, as a sub-effect of reducing the circuit, a linear characteristic effect-can be obtained in that the electric current is immediately reduced when the quantity of the electric current is required to be reduced and the electric current is slowly enlarged when the quantity of the electric current is restored to the original quantity.

The first embodiment is arranged to have the current limiting means for obtaining a quantity of an electric current which must be limited by using time delay occurring because the video signals are temporarily stored in the storage means, the current limiting means being arranged to obtain, in a period of time after the video signal is stored to reading and displaying the video signal, the quantity of the electric current which must be limited in accordance with video signals obtained from the video signals before the video signals are stored in the storage means. As a result, the limitation of the electric current can be performed without any response delay. The mismatch of the quantity of light to be emitted and the controlled variable can be prevented. Thus, appearance of flickers occurring because the current limiting circuit can be prevented. Even if the quantity of light is enlarged rapidly, flowing of an excessively large electric current can be prevented.

The smoothing process is not a simple smoothing process using a low pass filter to which the pseudo quantity of light to be emitted is subjected. The smoothing process is performed by using an average value of video signals obtained in field units. Therefore, the response speed can be raised and unnecessary response occurring attributable to the sub-field can be prevented.

(Second Embodiment)

Figure 5:
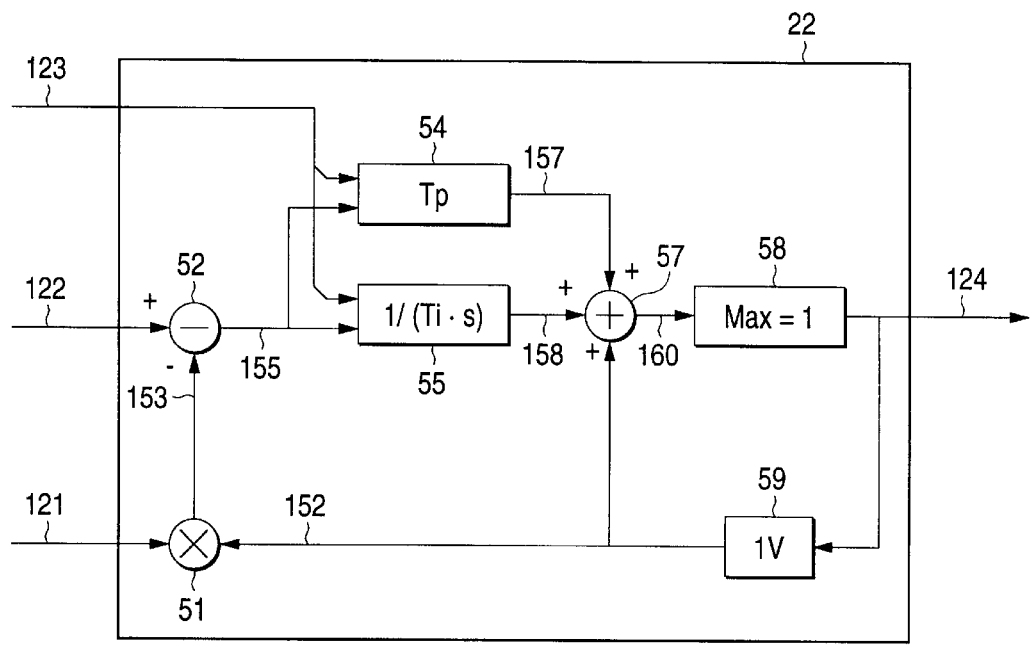
FIG. 5 is a diagram showing the structure of a pulse control-variable calculating means of a display apparatus according to a second embodiment.

FIG. 5 is a diagram showing a pulse control-variable calculating means 22 of a display apparatus according to a second embodiment of the present invention. Since the structure of the display apparatus is similar to that according to the first embodiment, the structure is omitted from description. The same reference numerals as those shown in FIG. 3 represent the same or corresponding elements. Hereinafter only portions different from those according to the first embodiment will now be described. Referring to FIG. 5, reference numeral 55 represents an integration-term calculating means 55, and 57 represents an addition means.

Figure 6:
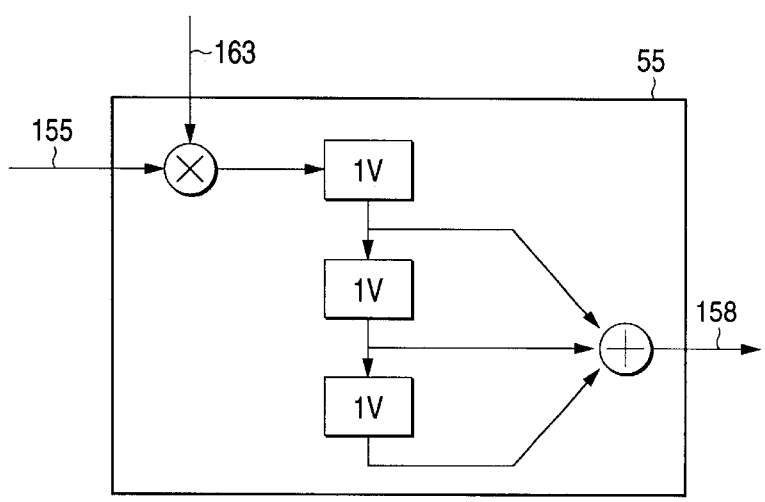
FIG. 6 is a diagram showing a means for calculating an integration term of the display apparatus according to the second embodiment.

The operation will now be described. The integration-term calculating means 55, as shown in FIG. 6, calculates the product of the deviation 155 and an integration-term constant 163 included in the response characteristic parameter 123 shown in FIG. 1, and then performs integration to output integration-term data 158. The addition means 57 adds proportionality-term data 157, integration-term data 158 and the controlled variable 152 of the number of pulses delayed by one field period to one another to output a controlled variable 160 of the number of pulses.

The second embodiment is arranged in such a manner that the proportionality term and the integration term are individually processed so that the parameter is easily finely set as compared with the first embodiment. Thus, the response characteristic of the current limiting circuit can finely be varied to be adaptable to the type of the video signal by changing the parameter. As a result, flickers occurring attributable to provision of the current limiting circuit can furthermore effectively be reduced.

(Third Embodiment)

Figure 7:
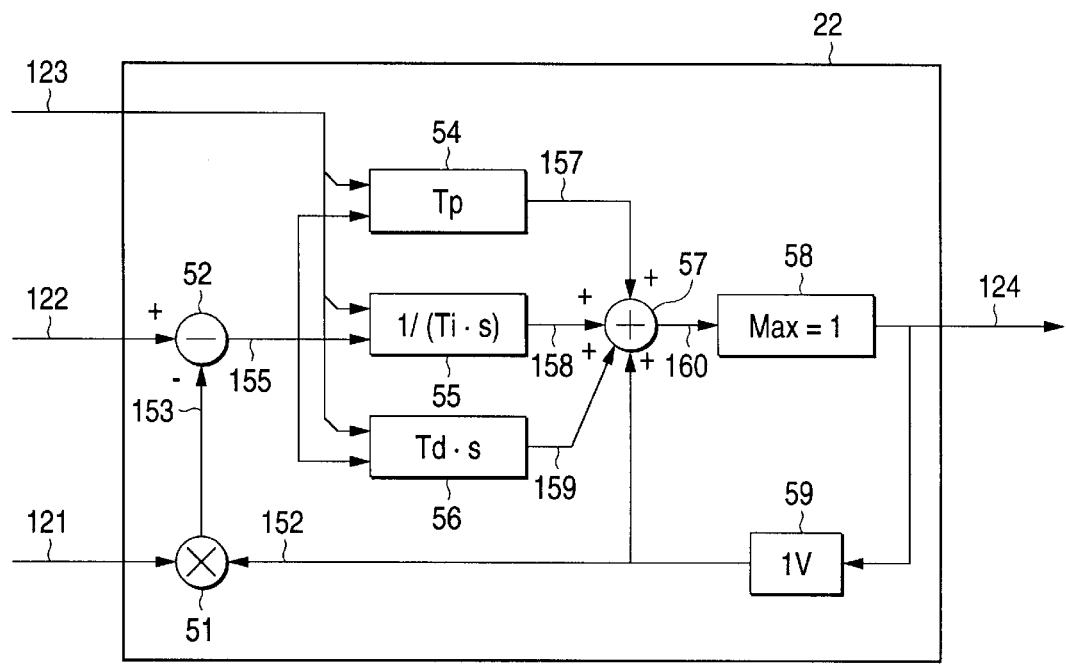
FIG. 7 is a diagram showing the structure of a display apparatus according to a third embodiment of the present invention.

FIG. 7 is a diagram showing the structure of a pulse control-variable calculating means 22 of a display apparatus according to a third embodiment of the present invention. Since the structure of the display apparatus is similar to that according to the second embodiment, the structure is omitted from description. The same reference numerals as those shown in FIG. 5 represent the same or corresponding elements. Hereinafter only portions different from those according to the second embodiment will now be described. Referring to FIG. 7, reference numeral 56 represents a differentiation-term calculating means, and 57 represents an addition means.

Figure 8:
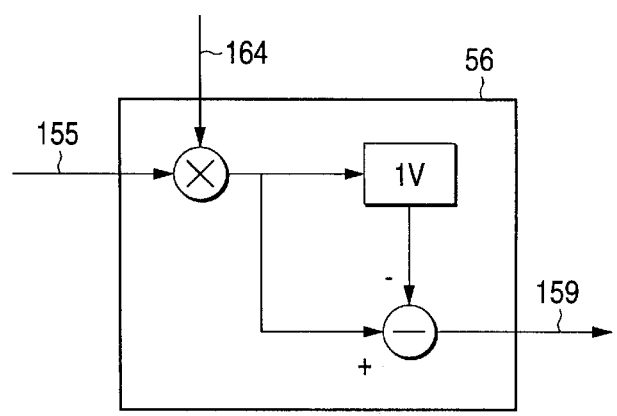
FIG. 8 is a diagram showing a means for calculating a differentiation term of the display apparatus according to the third embodiment.

The operation will now be described. The differentiation-term calculating means 56, as shown in FIG. 8, calculates the product of the deviation 155 and a differentiation-term constant 164 included in the response characteristic parameter 123 shown in FIG. 1. Then, the differentiation-term calculating means 56 performs differentiation with data at a position forward by one field to output differentiation-term data 159. The addition means 57 adds proportionality-term data 157, integration-term data 158, differentiation-term data 159 and the controlled variable 152 of the number of pulses delayed by one field to one another to output a controlled variable 160 of the number of pulses.

As compared with the second embodiment, the third embodiment has the structure that the proportionality term, the integration term and the differentiation term are used to obtain the quantity of electric currents which must be limited. Therefore, a great degree of freedom can be obtained when the parameter is set. Thus, the response characteristic of the current limiting circuit can furthermore finely be varied to be adaptable to the type of the video signal. As a result, the effect of preventing flickers occurring attributable to provision of the current limiting circuit can furthermore be improved.

(Fourth Embodiment)

Figure 9:
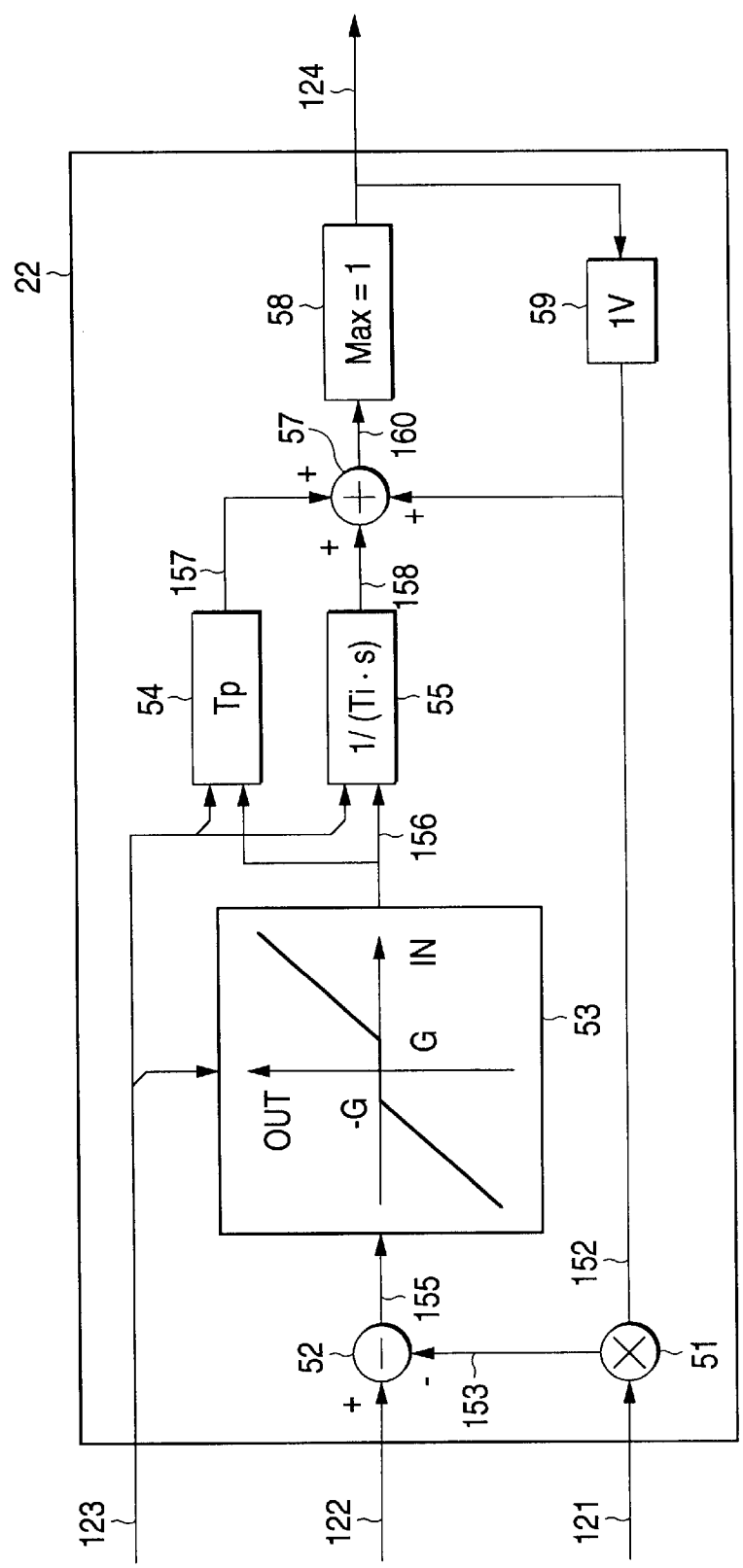
FIG. 9 is a diagram showing the structure of a pulse control-variable calculating means of a display apparatus according to a fourth embodiment.

FIG. 9 is a diagram showing the structure of a pulse control-variable calculating means 22 of a display apparatus according to a fourth embodiment of the present invention. Since the structure of the display apparatus is similar to that according to the second embodiment, the structure is omitted from description. The same reference numerals as those shown in FIG. 5 represent the same or corresponding elements. Hereinafter only portions different from those according to the second embodiment will now be described. Referring to FIG. 9, reference numeral 53 represents a non-linear characteristic providing means, 54 represents the proportionality-term calculating means and 55 represents the integration-term calculating means.

The operation will now be described. The non-linear characteristic providing means 53 receives the deviation 155 to output a deviation 156 obtained by adding a gap operation on the basis of an illustrated non-linear characteristic curve. The proportionality-term calculating means 54 outputs proportionality-term data 157 from the deviation 156 similarly to the method according to the second embodiment. Also the integration-term calculating means 55 outputs integration-term data 158 from the deviation 156 similarly to the method according to the second embodiment.

Setting of the gap operation which is performed by the non-linear characteristic providing means 53 can be varied by changing the value of break point G in an illustrated graph. Since a range from −G to +G for the deviation 155 is a non-response region, 0 is output. As a result, flickers of the frame occurring due to noise and slight erratic motion of the image can be prevented even if the response speed is raised.

The fourth embodiment is described about the structure in which the gap operation is added to the structure according to the second embodiment. The non-linear characteristic providing means 53 may be provided for the pulse control-variable calculating means 22 (see FIG. 3) according to the first embodiment and the pulse control-variable calculating means 22 (see FIG. 7) according to the third embodiment. Also the foregoing structure attains an effect similar to that obtainable from this embodiment.

(Fifth Embodiment)

Figure 10:
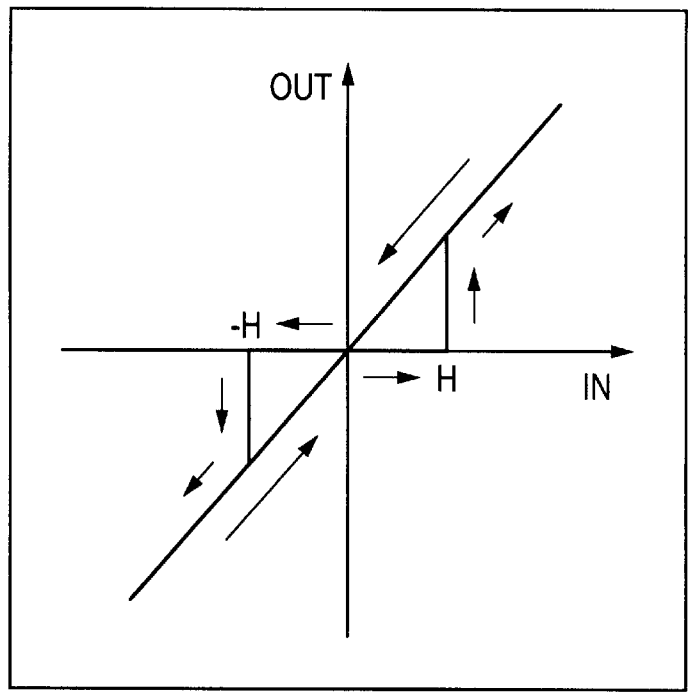
FIG. 10 is a graph showing variation in a deviation in a display apparatus according to a fifth embodiment of the present invention.

FIG. 10 is a graph showing variation in the deviation of the non-linear characteristic providing means 53 of the pulse control-variable calculating means 22 of a display apparatus according to a fifth embodiment. Since the structures of the display apparatus and the pulse control-variable calculating means 22 of the display apparatus are similar to those according to the fourth embodiment, only different portions from the fourth embodiment will now be described. The axis of abscissa of the graph stands for the deviation 155 which is shown in FIG. 9 and which is an input to the non-linear characteristic providing means 53, while the axis of ordinate stands for the deviation 156 which is an output from the non-linear characteristic providing means 53 and which is shown in FIG. 9.

The operation will now be described. In this embodiment, the non-linear characteristic providing means 53 shown in FIG. 9 has the characteristic shown in FIG. 10. Thus, the non-linear characteristic providing means 53 receives the deviation 155 to add a hysteresis operation to output the deviation 156.

The hysteresis operation is performed in a direction indicated by an arrow shown in FIG. 10. Setting of the hysteresis operation region can be varied by shifting H shown in the graph. If the deviation 155 is included in a range from −H to +H, 0 is output similarly to the gap operation because the foregoing region is a non-response region. When the deviation 155 is temporarily moved to the outside of the region −H to +H and then returned into the region −H to +H, a linear operation is performed. As a result, the deviation can be reset when the deviation is returned into the non-response region. Thus, a stationary deviation occurring when the gap operation is performed can be prevented.

Similarly to the fourth embodiment, the non-linear characteristic providing means 53 may be applied to the first embodiment or the third embodiment.

(Sixth Embodiment)

Figure 11:
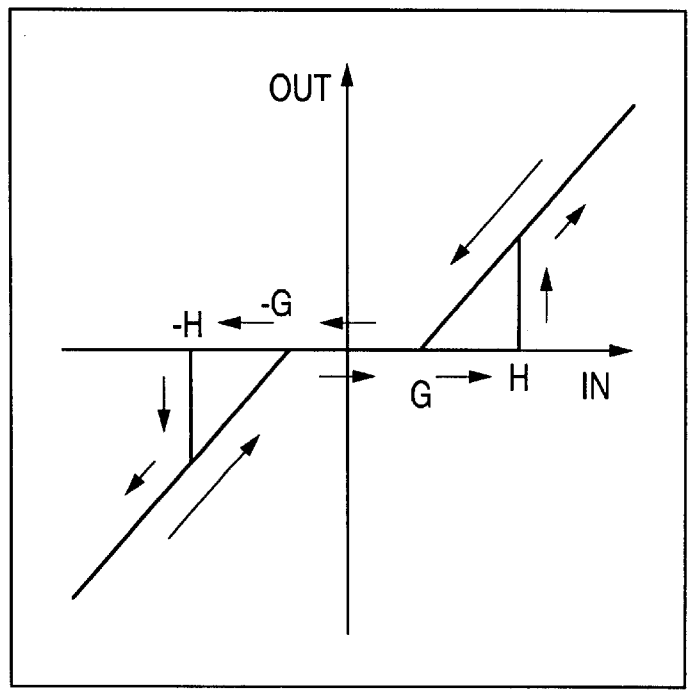
FIG. 11 is a graph showing variation in a deviation in a display apparatus according to a sixth embodiment of the present invention.

FIG. 11 is a graph showing variation in the deviation of the non-linear characteristic providing means 53 of the pulse control-variable calculating means 22 of a display apparatus according to a sixth embodiment of the present invention. The structures of the display apparatus and the pulse control-variable calculating means 22 of the display apparatus are similar to those according to the fourth embodiment. Therefore, only portions different from the fourth embodiment will now be described. In the graph, the axis of abscissa stands for the deviation 155 which is an input to the non-linear characteristic providing means 53 and which is shown in FIG. 9 and axis of ordinate stands for the deviation 156 which is an output from the non-linear characteristic providing means 53 and which is shown in FIG. 9.

The operation will now be described. In the sixth embodiment, the non-linear characteristic providing means 53 shown in FIG. 9 has the characteristic shown in FIG. 11. Thus, the non-linear characteristic providing means 53 receives the deviation 155, and then adds the gap and hysteresis operations to output the deviation 156.

The hysteresis operation is performed in a direction indicated by an arrow shown in FIG. 11. Setting of the gap operation region can be varied by shifting the position of G shown in the graph. Setting of the hysteresis operation region can be varied by shifting the position of H shown in the graph. When the deviation 155 is in a range from −G to +G, a gap characteristic is indicated. When the deviation 155 is in a range from −H to −G and in a range from +G to +H, a hysteresis characteristic is indicated.

Since this embodiment is structured to have both gap characteristic and the hysteresis characteristic, a great degree of freedom can be obtained in tuning as compared with a structure provided with only the gap characteristic or only the hysteresis characteristic. Thus, flickers of the frame occurring due to noise and slight erratic motion of the image can be prevented even if the response speed is raised.

Similarly to the fourth embodiment, the non-linear characteristic providing means 53 may be applied to the first embodiment or the third embodiment.

(Seventh Embodiment)

Figures 12, 13:
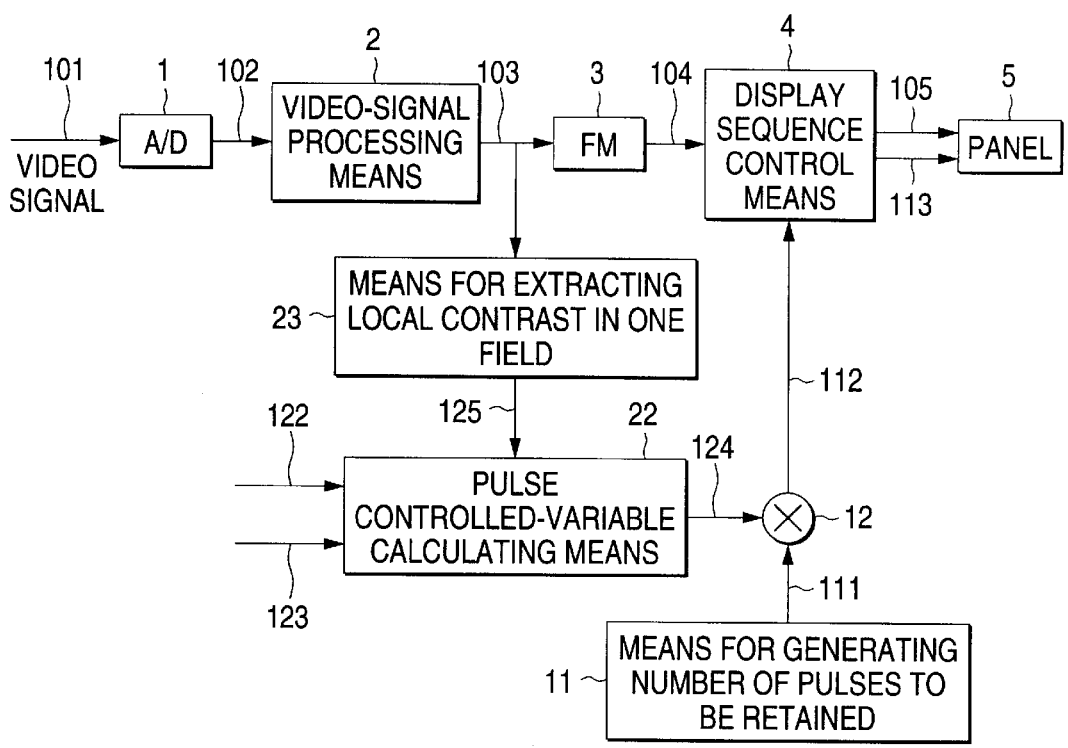
FIG. 12 is a diagram showing the structure of a display apparatus according to a seventh embodiment of the present invention.
FIG. 13 is a diagram showing a method of dividing a frame of the display apparatus according to the seventh embodiment into a plurality of blocks.

FIG. 12 is a block diagram showing the structure of an essential portion of a display apparatus according to a seventh embodiment of the present invention. Reference numerals which are the same as those shown in FIG. 1 represent the same or corresponding elements. Only portions different from those according to the first embodiment will now be described. Referring to FIG. 12, reference numeral 23 represents a local contrast extracting means.

In accordance with video-signal data 103 output from the video-signal processing means 2, the local contrast extracting means 23 extracts local contrast 125 for one field. The local contrast 125 is data normalized to 0 to 1 and calculated in field units. The local contrast 125 is supplied to the pulse control-variable calculating means 22 so as to be used as a condition under which the electric current is limited, similarly to the average value of the brightness levels according to the first to sixth embodiments. When the level of the local contrast 125 is high, the number of pulses is reduced to limit the electric current.

Figure 14:
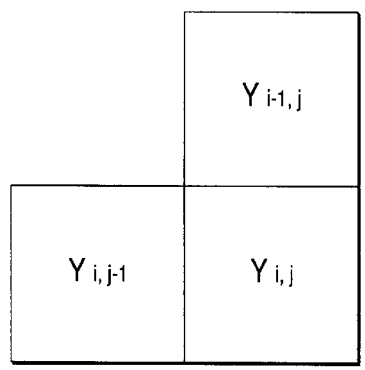
FIG. 14 is a block diagram showing adjacent blocks which are used when a local contrast in the display apparatus according to the seventh embodiment is obtained.
Figure 15:
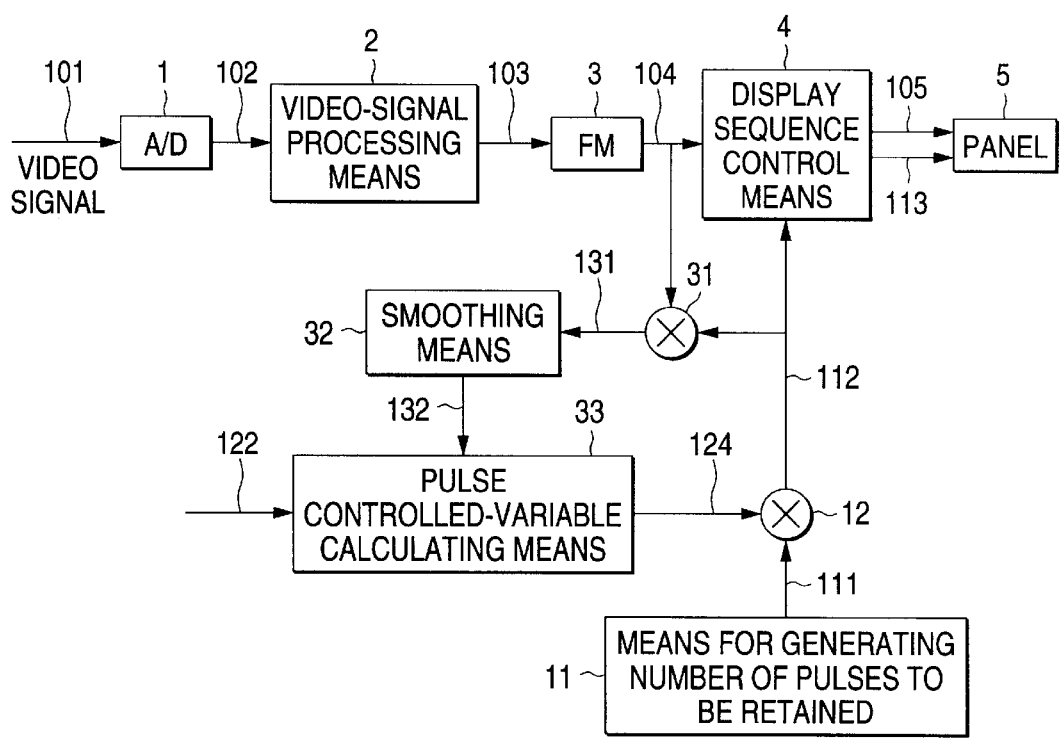
FIG. 15 is a diagram showing the structure of a conventional display apparatus.
Figure 16:
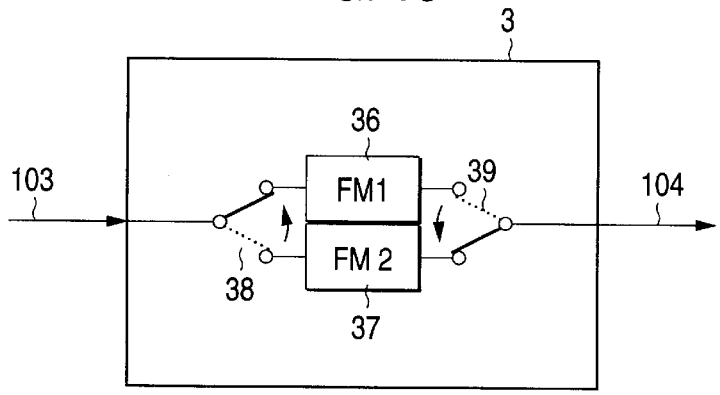
FIG. 16 is a diagram showing the structure of a storage means of the conventional display apparatus.
Figure 17:
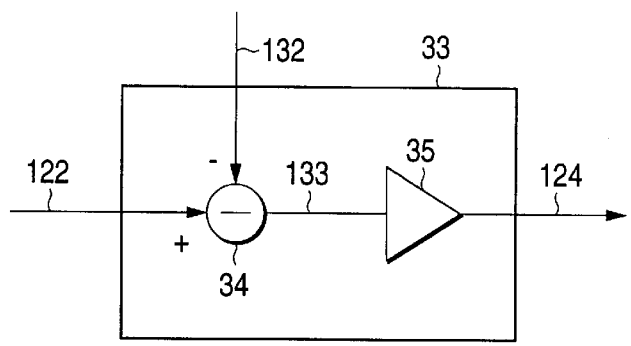
FIG. 17 is a diagram showing the structure of a pulse controlled-variable calculating means of the conventional display apparatus.
Figure 18:
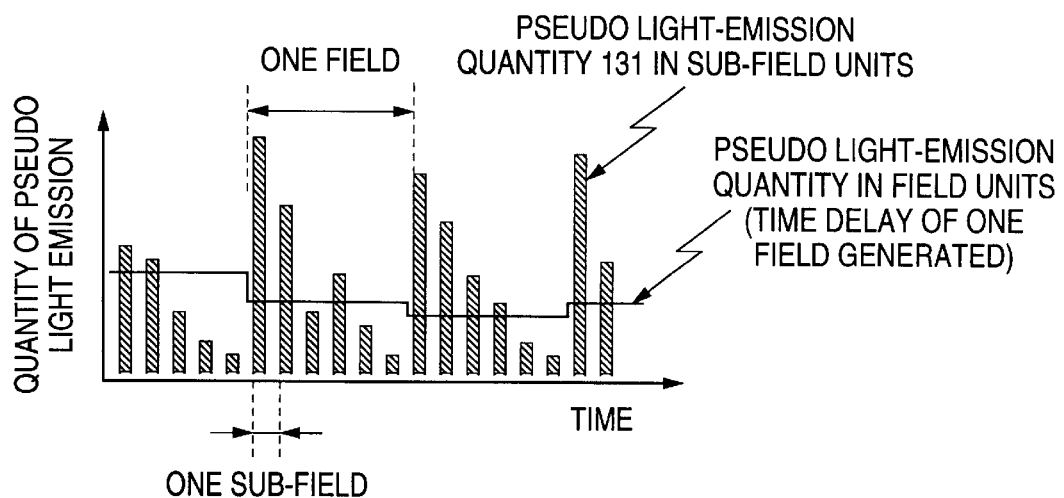
FIG. 18 is a graph showing a quantity of pseudo light emission in the pulse controlled-variable calculating means of the conventional display apparatus.

A method of deriving the local contrast 125 will furthermore be described with reference to FIGS. 13 and 14. FIG. 13 is a diagram showing a method of dividing the frame of the display apparatus according to the seventh embodiment into a plurality of blocks. FIG. 14 is a diagram showing adjacent blocks which are used when the local contrast of the display apparatus according to the seventh embodiment is obtained. Referring to FIG. 13, the overall portion indicate one display frame, in which m is the number of blocks in the vertical direction, n is the number of blocks in the horizontal direction and Yij ($1 \leq i \leq m$, $1 \leq j \leq n$) is an average value of brightness levels of video signals in a block which is an i-th position counted from an upper position and a j-th position counted from the left-hand position. FIG. 14 is a diagram showing three extracted blocks which are a portion of the blocks shown in FIG. 13.

The operation will now be described. In one field period, the local contrast extracting means 23 calculates an average value of brightness levels of video signals in each of m×n blocks shown in FIG. 13. An assumption is made that an average value in a block at the i-th position counted from an upper position and the j-th position counted from a left-hand position is calculated. Then, with reference to FIG. 14, the following calculation is performed:

$$C_{ij} = \|Y_{ij} - Y_{i-1,j}\| + \|Y_{ij} - Y_{i,j-1}\|$$

Note that ∥ indicates an absolute value. When i=1 or j=1, a term which is not calculated appears. Calculation as Σ Cij is performed for the overall frame, and then normalization to 0 to 1 is performed. Thus, the local contrast 125 can be obtained.

The seventh embodiment has the structure that the frame is divided into a plurality blocks, after which the average value of the brightness levels of the video signals in the block is obtained so that the local contrast in the frame is obtained, and then the local contrast is used as a representative value of the video signals to perform the calculation of the controlled variable of pulses. Therefore, distortion occurring attributable to heat caused from partial light emission of the panel can be prevented and power consumption can be reduced.

Since the present invention is structured as described above, the following effects can be obtained.

A display apparatus having a characteristic that power consumption therein is varied when brightness of a displayed image is varied and arranged in such a manner that a video signal is temporarily stored on storage means and the video signal is read from the storage means to display thereon comprises the current limiting means for obtaining a quantity of an electric current which must be limited in a period of time after the video signal is temporarily stored to reading and displaying the video signal, the current limiting means being arranged to obtain the quantity of the electric current which must be limited in accordance with video signals obtained before the video signals are stored in the storage means. As a result, the limitation of the electric current can be performed without any response delay. The mismatch of the quantity of light to be emitted and the controlled variable can be prevented. Thus, appearance of flickers occurring because the current limiting circuit can be prevented. Even if the quantity of light is enlarged rapidly, flowing of an excessively large electric current can be prevented.

As the index of the quantity of light to be emitted, the product of the number of cells from which light is emitted and the number of light emission times from the cells is not used. As an alternative to this, the average value of video signals is used. Thus, the quantity of electric currents which must be limited can be obtained from video signals obtained before they are stored in the storage means.

The smoothing process is not a simple smoothing process using a low pass filter to which the pseudo quantity of light to be emitted is subjected. The smoothing process is performed by using an average value of video signals obtained in field units. Therefore, the response speed can be raised and unnecessary response occurring attributable to the subfield can be prevented.

Since the quantity of electric currents which must be limited is calculated by using an average value of the brightness levels of video signals, the control of the electric current can be performed with the characteristic preferred for the response characteristic of the eyes of a human being. Therefore, brightness can be controlled in a manner easy on the eyes of a human being and the power consumption can be reduced.

Since the proportionality term, the integration term and the differentiation term are individually processed, setting of parameters can be facilitated. The response characteristic of the current limiting means can be varied only by changing the parameter. Thus, flickers occurring attributable to provision of the current limiting circuit can be prevented.

Since the quantity of electric currents which must be limited has the gap characteristic, flickers of the frame occurring due to noise and slight erratic motion of the image can be prevented even if the response speed is raised.

Since the quantity of electric currents which must be limited has the hysteresis characteristic, a stationary deviation can be prevented and flickers of the frame occurring attributable to noise and slight erratic motion of the image can be prevented.

Since the quantity of electric currents which must be limited has both of the gap characteristic and the hysteresis characteristic, a great degree of freedom can be obtained in performed turning. Flickers of the frame occurring attributable to noise and slight erratic motion of the image can furthermore effectively be prevented.

Moreover, the frame is divided into a plurality of blocks and the average value of the brightness levels of video signals in the block is obtained. Thus, the local contrast in the frame is obtained and the quantity of electric currents which must be limited is calculated in accordance with the local contrast. Therefore, partial distortion of the panel attributable to heat can be prevented and power consumption can be reduced. In particular, an effect of protecting a panel can be obtained in a case of a plasma display in which ineffective energy is formed into heat which is concentrated to a glass substrate of the panel.

What is claimed is:

1. A display apparatus having a characteristic that power consumption therein varies in accordance with variation of brightness of a displayed image and arranged in such a manner that a video signal is temporarily stored in a memory and the video signal is read out of the memory to be displayed thereon, said display apparatus comprising:

a current limiter operatively connected to an input part that receives the video signal, said current limiter being arranged to receive the video signal before it is stored in the memory, said current limiter being arranged to obtain a quantity of a limited electric current in a period of time between when the video signal is temporarily stored in the memory and when the video signal is read out of the memory, and said current limiter being arranged to obtain said quantity of a limited electric current using a reference value and a value that is derived from brightness levels of the video signal, wherein said current limiter is further arranged to obtain a proportionality term, arranged to obtain an integration term, and arranged to obtain the quantity of a limited electric current using said proportionality term and said integration term.

2. The display apparatus of claim 1, wherein said current limiter is further arranged to use a non-response region in obtaining the quantity of a limited electric current.

3. The display apparatus of claim 1, wherein said current limiter is further arranged to use a hysteresis characteristic in obtaining the quantity of a limited electric current.

4. The display apparatus of claim 1, wherein said current limiter is further arranged to use a non-response region and a hysteresis characteristic in obtaining the quantity of a limited electric current.

5. A display apparatus having a characteristic that power consumption therein varies in accordance with variation of brightness of a displayed image and arranged in such a manner that a video signal is temporarily stored in a memory and the video signal is read out of the memory to be displayed thereon, said display apparatus comprising:

a current limiter operatively connected to an input part that receives the video signal, said current limiter being arranged to receive the video signal before it is stored in the memory, said current limiter being arranged to obtain a quantity of a limited electric current in a period of time between when the video signal is temporarily stored in the memory and when the video signal is read out of the memory, and said current limiter being arranged to obtain said quantity of a limited electric current using a reference value and a value that is derived from brightness levels of the video signal, wherein said current limiter is further arranged to obtain a proportionality term, arranged to obtain an differentiation term, and arranged to obtain an integration term, and arranged to obtain the quantity of a limited electric current using said proportionality term, said integration term, and said differentiation term.

6. The display apparatus of claim 5, wherein
said current limiter is further arranged to use a non-response region in obtaining the quantity of a limited electric current.

7. The display apparatus of claim 5, wherein
said current limiter is further arranged to use a hysteresis characteristic in obtaining the quantity of a limited electric current.

8. The display apparatus of claim 5, wherein
said current limiter is further arranged to use a non-response region and a hysteresis characteristic in obtaining the quantity of a limited electric current.

* * * * *